March 26, 1935.　　　J. G. SHODRON　　　1,995,551
METHOD AND APPARATUS FOR STORING AND DISPENSING FEED
Filed Oct. 14, 1932　　　2 Sheets-Sheet 1
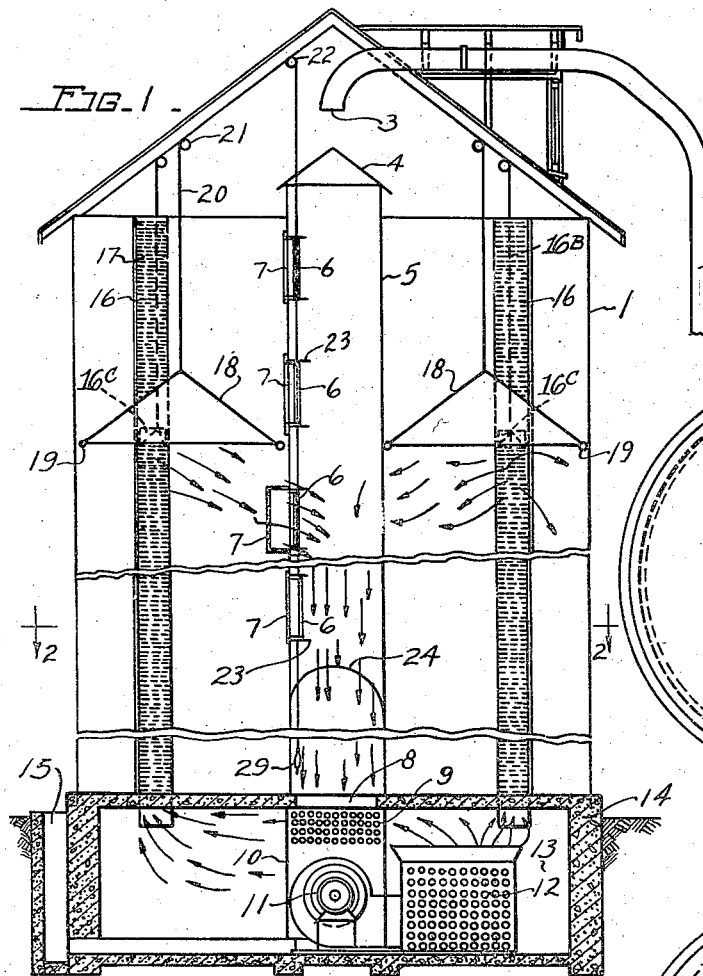
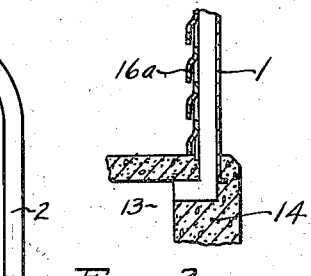
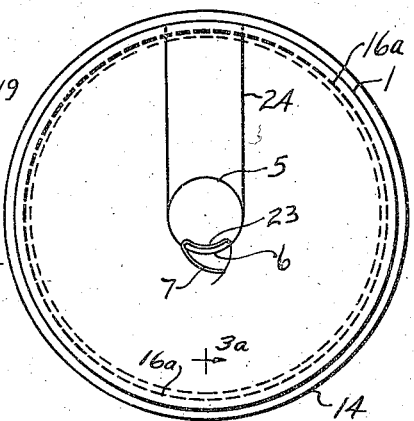
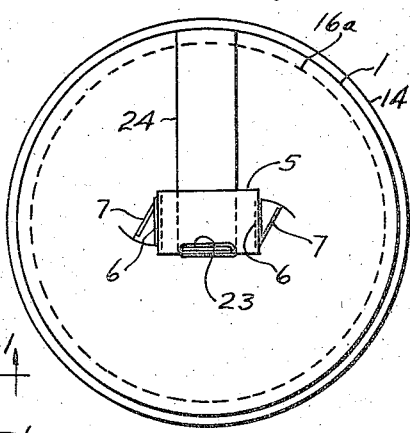
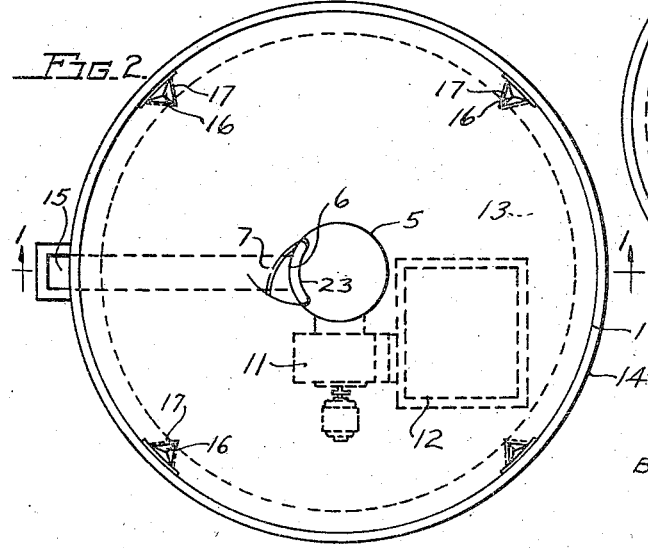
INVENTOR
John G. Shodron.
BY
ATTORNEYS

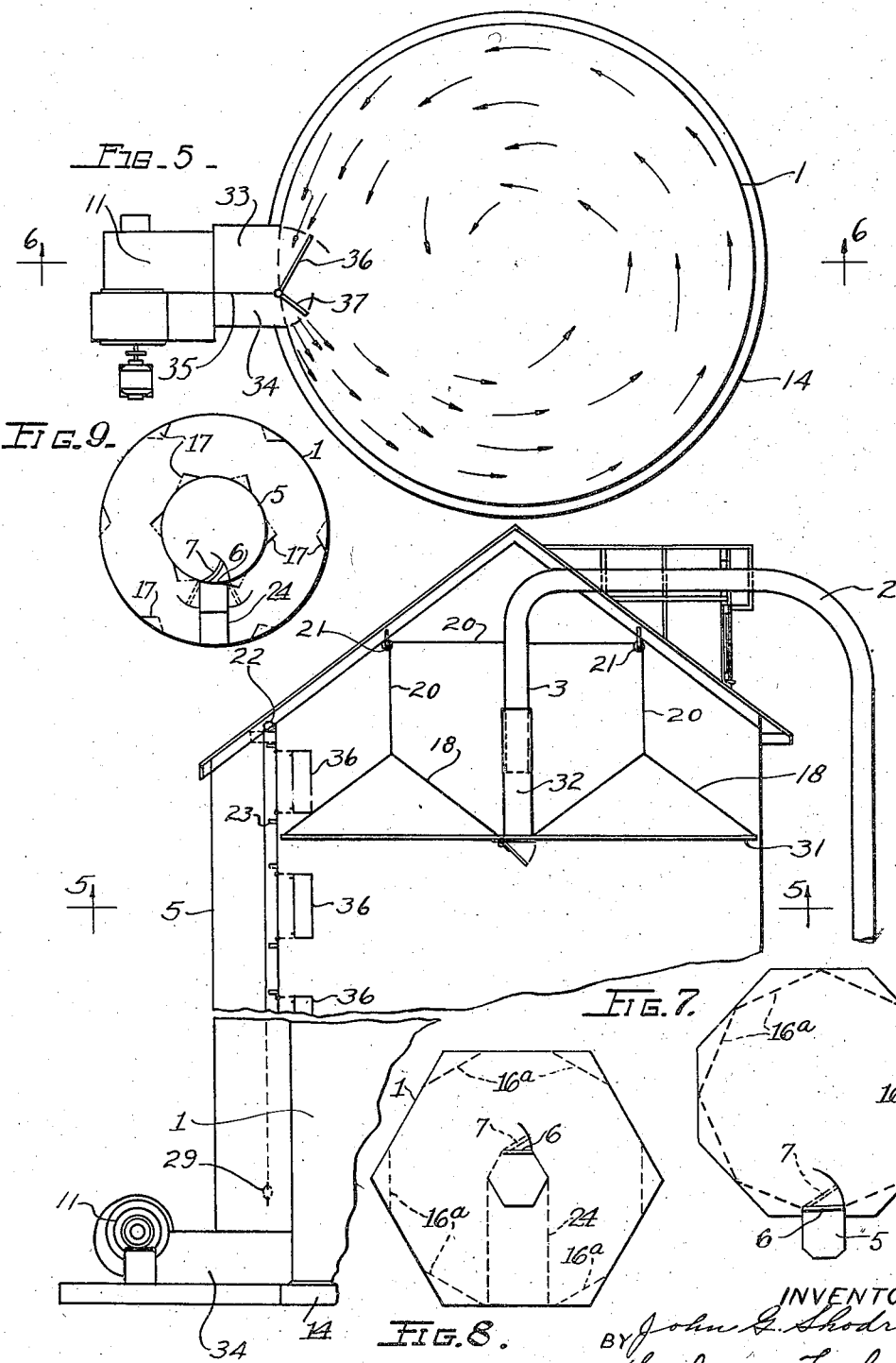

Patented Mar. 26, 1935

1,995,551

UNITED STATES PATENT OFFICE 1,995,551

METHOD AND APPARATUS FOR STORING AND DISPENSING FEED

John G. Shodron, Fort Atkinson, Wis., assignor to James Manufacturing Company, Fort Atkinson, Wis., a corporation of Wisconsin Application October 14, 1932, Serial No. 637,817

5 Claims. (Cl. 34—19)

My invention relates to an apparatus and method for the storing, curing and preserving of hay and other similar materials.

It will be understood that hay, no matter to what extent it may be cured by the sun and wind in the field after cutting, contains a certain percentage of moisture.

It is further understood that it is highly desirable to be able to cut the hay, allow it to partially sun cure for a brief period and then gather it in a state in which it is greener than usual and store it, but, due to the combustible gases in hay thus stored or to spontaneous combustion of hay so stored, frequent fires result destroying the hay and the barns in which it is stored. Furthermore, the storing of hay that has not been completely cured leads to the moulding of the hay and other forms of spoilage which makes the hay unpalatable for stock and sometimes dangerous for stock to eat. Furthermore, the hay has a tendency in the presence of air when so stored for the upper layers to be particularly subjected to formation of mould and deterioration from various causes.

Depending upon the state of curing, the conditions of moisture surrounding the gathering of the hay, the type of hay, the age of the hay and the size of the stack in which stored, different conditions of temperature and ventilation have to be adjusted to the different conditions of the hay.

In order to effect this adjustment and to control these several factors in order to not only store the hay free from spontaneous combustion but to continue its curing within the hay stack rather than outdoors where it may be first ruined by the weather while waiting to be cured, I have provided a circulatory system by which air may be circulated through the hay mass and means by which the temperature of the air so circulated may be controlled.

Therefore, my invention comprises generally the provision of a container of such dimensions that air may be circulated through the entire mass of the hay, means of deliverying the air to different levels of the hay so as to permit of circulation throughout the entire mass of the hay and means of heating the air in the circulatory system.

Referring to the drawings:

Figure 1 is a vertical section through the hay container showing the circulatory system; the hay has been omitted for the purpose of clarity;

Figure 2 is a section on the line 2—2 of Figure 1;

Figure 3 is a plan view of an alternate form;

Figure 3a is a section on the line 3a—3a of Figure 3;

Figure 4 is a plan view of an alternate form;

Figure 5 is a section on the line 5—5 of Figure 6;

Figure 6 is a section on the line 6—6 of Figure 5;

Figure 7 is a diagrammatic view of an alternate form of air distribution duct and an alternate form of container;

Figure 8 is a similar modification of both the arrangement of the air ducts and the container form;

Figure 9 is a modified view of the arrangement of the triangular-shaped air ducts.

Referring to the drawings in detail, 1 designates a container of any desired form but preferably cylindrical, which contains the hay. It will be understood that in order to increase the amount of hay that is stored, to provide uniformity of the hay structure when it is stored and to provide a uniform medium through which the air is to be circulated, I prefer to chop the hay. After the hay is chopped, it is blown through the pipe 2 by any desired means and is discharged through the opening 3 into the interior of the container 1. It is usually discharged over the cap plate 4 of the chute 5 which assists in distributing the hay evenly throughout the entire container. This chute 5 is provided with a plurality of openings 6 controlled by doors 7. The bottom of the chute is provided with a grill 8 through which air is drawn over the coils 9 in the passageway 10 into the fan 11 whence the air is discharged over the coils 12 into the cellar 13 within the foundation 14. Fresh air is drawn into the fan through the passageway 15 in the foundation. The air so discharged into the chamber 13 is discharged upwardly through a plurality of vertically-disposed ducts 16. These ducts are provided with laterally-disposed openings 17. They are preferably triangular in shape although they may be of any desired form and arrangement as indicated in Figures 7, 8, and 9. These ducts discharge laterally into the hay mass. The air passes through the entire body of the hay, thence through the door openings 6 as controlled by the doors 7. In the ducts 16 are adjustable valves 16c adapted to be moved up and down to form stops for the air moving up in the ducts. These valves are adjusted by means of cables 16b which may pass over pulleys and down the inside of the chute 5.

Suspended over the top of the hay are one or more cone-shaped hoods or deflectors 18 made of canvas or light metal having an annular frame 19. In plan the hoods 18 would be of the shape of the space between the central chute 5 and the inner surface of the container 1, with notches in the hood to fit freely over the V-shaped ducts 16, and with a central opening to accommodate the chute 5, whereby the hoods may be raised and lowered by the cables. These hoods are suspended by cables 20 passing over the pulleys 21. The free ends of the cables are controlled by the operator as desired. They may all be conveyed to a central pulley 22 and thence downwardly alongside of the chute 5 as indicated. The interior of the chute is provided with rungs 23 to form a ladder. The bottom of the chute is provided with a horizontal passageway 24 so that the operator may pass through and beneath the hay mass into the chute 5 and thence up the ladder 23.

It will be observed that in Figure 3 instead of using the air ducts 16 I employ an inwardly-disposed perforated wall structure constituting a false wall 16a. Air is delivered in the space between the outside wall 1 and the wall 16a from the cellar chamber 13. The air is thus distributed throughout the entire hay mass.

In Figure 4 the chute 5 is rectangular and is provided with doors 7 on opposite sides so that the air may circulate from the opposite sides into the chute from the openings in the false walls 16a.

Turning to Figures 5 and 6, I provide an annular plate 31 having a plurality of hoods 18 suspended by the cables 20. These hoods move as a unit with the plate 31 and the plate 31 carries a pipe 32 which slides over the delivery spout 3 of the pipe 2. Thus, the delivery of the hay is always beneath the plate 31 and the hoods 18 and the height of the entire assembly may be adjusted by the cables 20. These cables are conveyed over pulleys 21 and 22 so that the cable can terminate at the point 29 in the chute 5 which, in this case, is to one side of the hay mass. In this case the chute is divided into two compartments 33 and 34 by a partition 35, the respective compartments having their own series of doors 36 and 37.

The fan 11 has its respective sides connected with the passageways 33 and 34 so that one passage is an intake passageway and the other is a discharge passageway and the air is so taken in and discharged at different levels according to the adjustment of the doors 36 and 37.

In the arrangement shown in Figure 7 the outside wall 1 is octagonal and the inside foraminous wall 16a is octagonal, providing air spaces of triangular shape through which the air is delivered to the hay mass through the wall 16a.

In the form shown in Figure 8 the outside wall is hexagonal and the corners thus formed in combination with the false wall 16a form ventilating passageways such as heretofore described.

These forms in Figures 7 and 8 have a particular advantage in that the false walls 16a form false braces for supporting the structure permitting of a lighter outside wall being employed and securing the greatest stability in the case of storms.

Figure 9 shows a modification in which there are ventilation passageways 17 on the inside and outside of the hay mass, the inner set of said passageways being mounted upon the chute 5.

It will be understood that the apparatus for practicing my process and for the building of the combinations constituting my invention may be made of metal or any other materials. However, I prefer metal as it can be fabricated in sections at a factory and erected on the farm by bolting or welding. It is also a conductor of electricity and prevents the ignition of the hay by lightning or other forms of electricity.

It will be understood that I desire to comprehend within my invention such modifications as may be necessary to adapt it to varying conditions and uses.

Having thus fully described my invention, what I claim as new and desire to secure by Letters Patent, is:

1. In combination, a hay container having a roof, a chute within said hay container having a roof, a plurality of doors controlling openings at different levels in said chute, a plurality of foraminous duct passageways within said container a valve in each passageway so that the duct will deliver air at different levels in the hay mass within the container and around the chute, adjustable means for confining the air above the top of the hay within the container and around the chute, means for delivering the hay into the top of the container through the roof thereof, and means beneath the container for circulating air under pressure through said air passageways, the chute and the hay mass.

2. A method of storing hay, consisting of the following steps: (1) placing the hay in a container; (2) ventilating the hay; (3) gathering the ventilating air over the upper surface of the hay mass; (4) and directing such air downward upon the upper portion of the mass of hay, such ventilating air being under pressure to force its way through the body of the hay and back downward upon the upper portion of the mass.

3. A method of storing hay, consisting of the following steps: (1) placing the hay in a container; (2) ventilating the hay; (3) gathering the ventilating air over the upper surface of the hay mass; (4) directing such air downward upon the upper portion of the mass of hay, such ventilating air being under pressure to force its way through the body of the hay and back downward upon the upper portion of the mass; and (5) heating such air before it enters upon the ventilating step.

4. In an apparatus for storing hay, the combination with a hay container and foraminous-walled ducts located in the container, of adjustable valves in the ducts adapted to limit to different levels the travel of air up the ducts, and deflectors suspended in the hay container and adapted to be distributed to likewise limit to different levels the air that issues from the ducts in the chamber.

5. In an apparatus for storing hay, the combination with a hay container, a hood structure adapted to be adjusted up and down in the container, of a hay delivery pipe extending upward above the container and thence downward in the container, and a telescoping pipe mounted on said delivery pipe and adjustable with the hood structure.

JOHN G. SHODRON.